United States Patent [19]
Seong et al.

[11] Patent Number: 5,698,963
[45] Date of Patent: Dec. 16, 1997

[54] BATTERY CHARGING CIRCUIT WITH CHARGING RATE CONTROL

[75] Inventors: Hwan-Ho Seong, Seoul; Sang-Tae Im, Kyungki-do, both of Rep. of Korea

[73] Assignee: Samsung Electronics Co., Ltd., Suwon, Rep. of Korea

[21] Appl. No.: 635,671

[22] Filed: Apr. 22, 1996

[30] Foreign Application Priority Data

Sep. 12, 1995 [KR] Rep. of Korea ................. 29705/1995

[51] Int. Cl.[6] ................................................. H01M 10/46
[52] U.S. Cl. ................................. 320/20; 320/23; 320/49
[58] Field of Search ................................. 320/5, 2, 20, 21, 320/22, 23, 30, 39, 40, 49; 336/DIG. 2

[56] References Cited

U.S. PATENT DOCUMENTS 5,442,274  8/1995  Tamai ........................................... 320/23
5,541,491  7/1996  Yamazaki et al. .......................... 320/22

Primary Examiner—Edward Tso
Attorney, Agent, or Firm—Cushman Darby & Cushman, IP Group Of Pillsbury Madison & Sutro LLP

[57] ABSTRACT

A battery charging circuit controls between rapid charging and trickle charging used to charge a NiCd/NiMH battery. The circuit perceives when the rapid charging operation has completely charged the battery and thereafter converts the charging operation to a trickle charging in order to compensate for the charging loss of a battery due to the leakage discharge. The form of charging is controlled by restricting the maximum amount of current provided to the battery using current-mode pulse width modulation.

21 Claims, 2 Drawing Sheets

FIG.2A
Section 200 Output
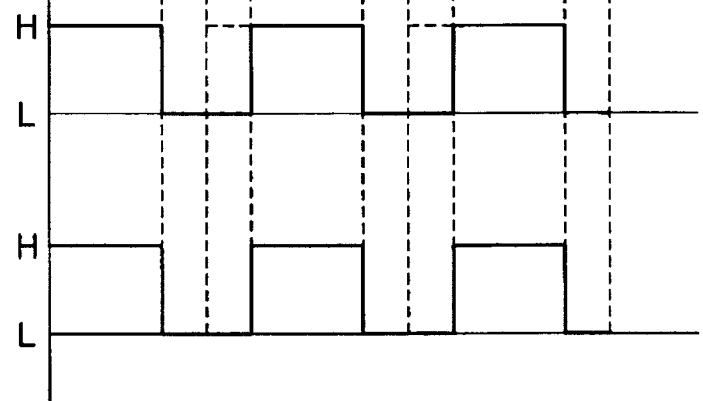
FIG.2B
COMP311 Output
FIG.2C
Driving Part Output
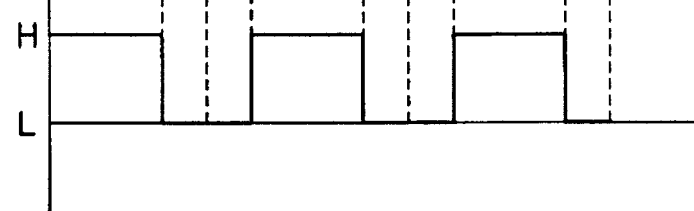
FIG.3A
Section 200 Output in Rapid Charging
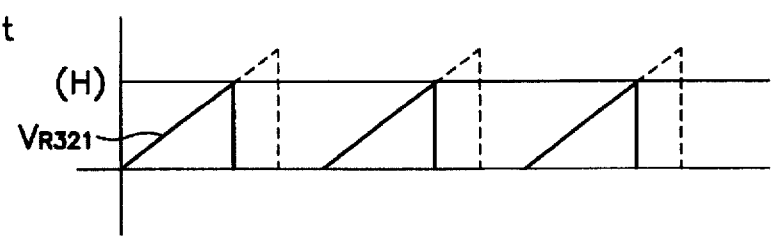
FIG.3B
Section 200 Output in Trickle Charging
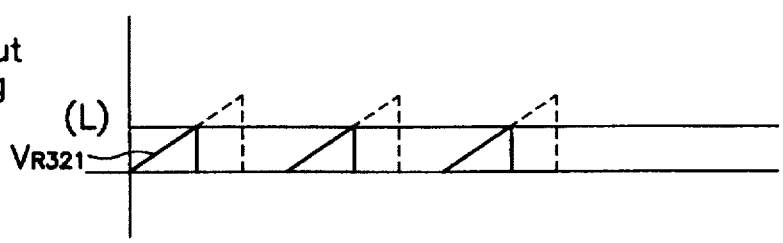

BATTERY CHARGING CIRCUIT WITH CHARGING RATE CONTROL

BACKGROUND OF THE INVENTION

1. Field of Invention

The present invention relates in general to a battery charging circuit for a Nickel Cadmium (NiCd) / Nickel Metal Hydride (NiMH) battery, and more particularly, to a battery charging circuit with charging form conversion control for a NiCd/NiMH battery which compensates for charging losses which occur after the battery has been completely charged by providing a constant trickle current to the battery.

2. Description of Related Art

A NiCd battery is a type of alkaline battery which uses Nickel (Ni(OH)$_3$) for the positive electrode, Cadmium (Cd) for the negative electrode, and kalium oxalate (KOH) for the electrolyte, and which has a terminal voltage of 1.3 volts. One type of NiCd battery uses sintered plates for electrodes. These have a low internal resistance and are suitable for discharging current because the range of contact between the active material and the electrolyte is very broad.

The NiCd battery provides a short charging time, a broad range of uses, and has a strong ability to withstand deep discharge and overcharge. A fully sealed NiCd battery inhibits the generation of gas by balancing the amount of active material used. This type of battery is used instead of dry batteries for radios, tape recorders, etc.

After performing a rapid charging of the NiCd or NiMH battery, a trickle current is provided to offset a leakage current. At this time, the amount of charge provided to the battery is about 1/20–1/30 coulomb when the capacity of an ordinary battery is fixed on the basis of 1 coulomb, and the current is about 20–30 mA.

Conventional rapid charging circuits use voltage-mode Pulse Width Modulation (PWM) to provide the trickle current to prevent the leakage current after rapid charging. However, with this technique it is difficult to provide the battery with a constant current of 20–30 mA during the trickle charging operation.

SUMMARY OF THE INVENTION

An object of the present invention is to provide a battery charging circuit with charging form conversion control for a NiCd/NiMH battery which solves the problems of the conventional art, and which compensates for the charging losses of a battery due to leakage discharge.

In order to achieve these and other objects, the battery charging circuit of the present invention perceives when the rapid charging operation has completely charged the battery and thereafter converts the charging operation to a trickle charging in order to compensate for charging losses due to leakage discharge. The form of charging is controlled by restricting the maximum amount of current provided to the battery using current-mode pulse width modulation.

BRIEF DESCRIPTION OF THE DRAWINGS

The preferred embodiment of the present invention will be described with reference to the accompanying drawings in which:

FIGS. 2A to 2C are waveform drawings illustrating an operation of each section in the circuit of FIG. 1.

FIGS. 3A and 3B are waveform drawings illustrating the comparison between rapid charging and trickle charging the circuit of in FIG. 1.

DETAILED DESCRIPTION OF THE PREFERRED EMBODIMENT

Figure 1:
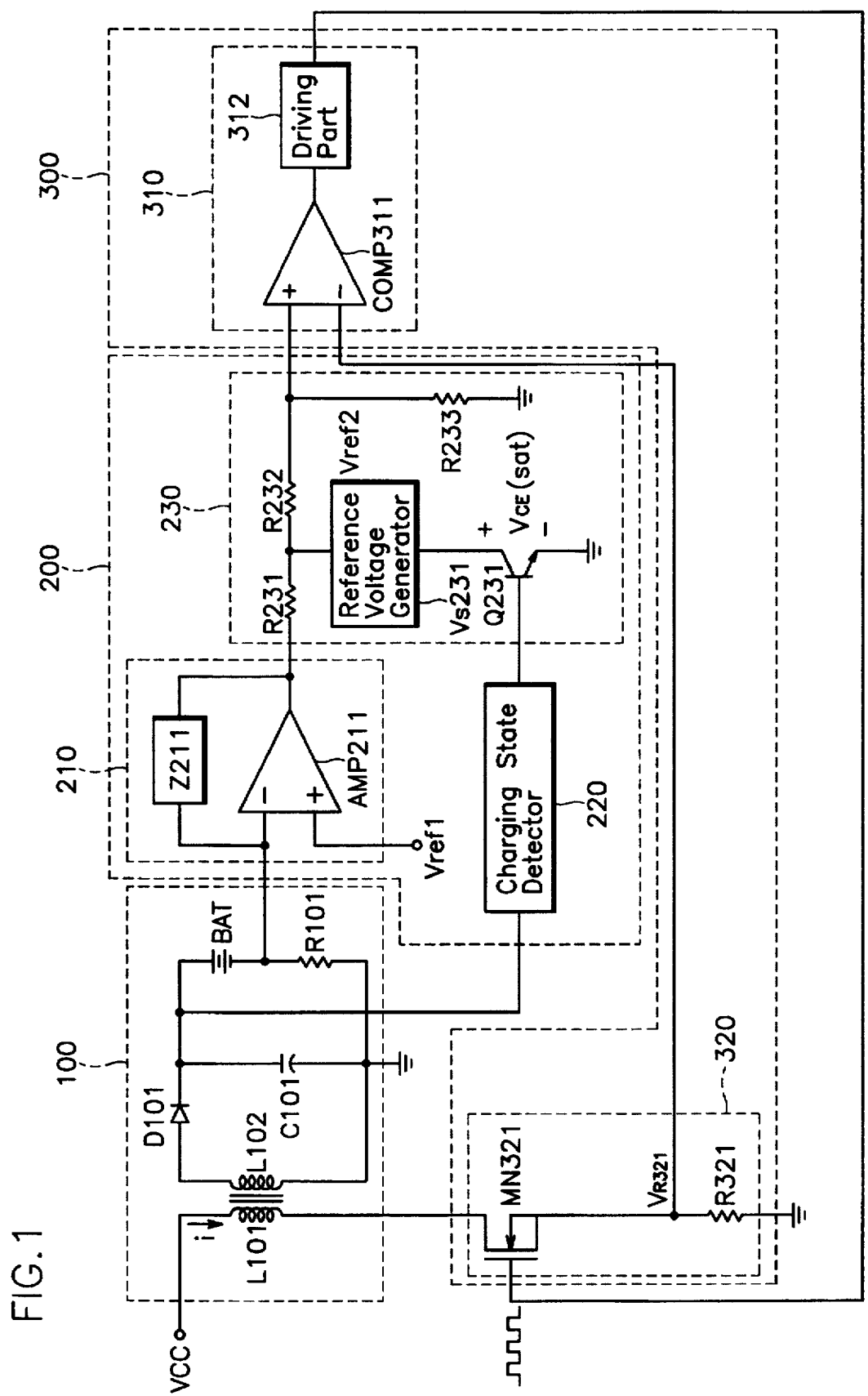
FIG. 1 is a circuit diagram illustrating a battery charging circuit with charging form conversion control for a NiCd/NiMH battery according to the preferred embodiment of the present invention.

Illustrated in FIG. 1 is a battery charging circuit with charging form conversion control for a NiCd/NiMH battery according to the preferred embodiment of the present invention. The circuit includes a charging section 100 which receives a signal by electromagnetic induction when power is applied to charge the battery. A charge detection section 200 monitors the charging state of a battery charged by the charging section 100, decides whether the battery is fully charged, and outputs a signal corresponding to the decision. A charging form control section 300 operates according to the signal outputted from the charge detection section 200 to adjust the charging form of the charging equipment between rapid charging and trickle charging.

The charging section 100 includes a first coil L101 which inputs applied power supply VCC at one terminal; a second coil L102, of which one terminal is grounded, to input and output the current induced from the first coil L101; a diode D101, the anode of which is connected to the other terminal of the second coil L102 and the cathode of which is connected to the positive terminal of a NiCd/NiMH battery BAT; a capacitor C101 has its positive electrode connected with the negative terminal of the battery BAT and its negative electrode is grounded; and a resistance R101 has one terminal connected to the negative terminal of the battery and the other terminal is grounded.

The charge detection section 200 includes a charge comparator 210 which outputs a signal corresponding to the charging rate of the battery after detecting a voltage from the charging section 100 and comparing it with a first reference voltage; a charging state detector 220 which detects the charging voltage of the battery and, accordingly, outputs a signal when the charging is finished; and a charging form converter 230 which receives the signals outputted from the charge comparator 210 and the charging state detector 220, and outputs a signal for converting to trickle charging when the rapid charging of battery BAT is finished.

The charge comparator 210 includes a first error amplifier Amp 211 having one terminal of the resistance R101 of the charging section 100 connected to an inversion input terminal thereof and a reference voltage Vref1 connected to a non-inversion input terminal thereof, and an impedance Z211 connected between the inversion input terminal of the first error amplifier Amp 211 and the output terminal thereof.

The charging form converter 230 includes a first resistance R231 which inputs the output signal of the charge comparator 210 to one terminal thereof; a second resistance R232 which has the other terminal of the first resistance R231 connected to one terminal thereof; a third resistance R233 which has the other terminal of the second resistance R232 connected to one terminal thereof and has the other terminal grounded; a transistor Q231 which has the output signal of the charging state detector 220 inputted to its base and its emitter is grounded; and a standard voltage generator Vs231 which has the other terminal of the first resistance R231 connected to an input terminal thereof and the collector of the transistor Q231 connected to an output terminal thereof.

The charging form control section 300 includes a signal generator 310 which generates and outputs a driving signal for switching the charging form between high or low speeds according to a signal outputted from the charge detection section 200, and a power supply controller 320 which controls whether the power supply VCC of the charging section 100 is supplied according to a signal outputted from the signal generator 310.

The power supply controller 320 includes an n-channel MOS transistor MN321 which has the output signal of the signal generator 310 inputted to a gate terminal thereof and the other terminal of the first coil L101 of the charging section 100 connected to a drain terminal thereof, and a resistance R321 which has the source terminal of the NMOS transistor MN321 connected to one terminal thereof and the other terminal grounded.

The signal generator 310 includes a second comparator COMP311 which has the output of the charging form converter 230 inputted to a non-inversion input terminal thereof and the source of the NMOS transistor MN311 of the power supply controller 320 is connected to an inversion input terminal thereof, and a driving part 312 which outputs a signal for driving the NMOS transistor MN321 of the power supply controller 320 according to a signal inputted from the second comparator COMP311.

The operation of the present invention is described hereinbelow.

To rapidly charge a NiCd or NiMH battery, a battery BAT is connected to capacitor C101 of charging section 100 in parallel with the resistance R101 as illustrated in FIG. 1. When the power supply VCC is applied, the current supplied by induction between the first coil L101 and second coil L102 is accumulated in the capacitor C101, so that it may charge the battery. Initially, the current-mode PWM control method causes a fixed voltage to apply across a resistance R101 so that a constant current is provided to battery BAT in the rapid charging state.

In the rapid charging state, the value of the voltage applied to both terminals of the resistance R101 of a charging section 100 is fed back negatively to maintain a reference voltage Vref1. Further, a high constant current is provided to the battery, so that first error amplifier AMP211 outputs a voltage signal corresponding to the width of a pulse to cause the reference voltage Vref1 to be applied to the resistance R101.

The charging state detector 220 outputs a low signal because the battery is not yet fully charged, so that the transistor Q231 of charging form converter 230 maintains the "OFF" state. Therefore, the output of the charge detection section 200 during the rapid charging is illustrated by the waveform shown in FIG. 2A.

The second comparator COMP311 of charging form control section 300 receives the signal outputted from charging form converter 230 via its non-inversion input terminal, outputs a pulse after comparing it with the voltage of resistance R321 positioned in a power supply controller 320 and drives NMOS transistor MN321 via a driving part.

The driving part 312 drives the NMOS transistor MN321 of the power supply controller 320 according to the pulse signal outputted from the second comparator COMP311. If the NMOS transistor MN321 is turned on, the battery is charged via the current induced between the first and second coils L101, L102 of the charging section 100.

The diode D101 prevents the electric charges accumulated in the capacitor C101 from flowing back to the second coil L102.

The voltage across resistance R321 begins to rise according to the turning on of the NMOS transistor MN321. When the voltage $V_{R321}$ across resistance R321 equals the output voltage of the charging form converter 230, the output signal from second comparator COMP311 of the signal generating part 310 is converted to a low signal as in FIG. 2B. When the output signal from second comparator COMP311 is converted to a low as FIG. 2C, the driving part 312 turns off the NMOS transistor MN321 of the power supply controller 320 by converting to a low signal as shown in FIG. 2C. Accordingly, the voltage across the resistance R321 of the power supply controller 320 goes down to zero, and the output signal of the second comparator COMP 311 is converted to a high signal again. The driving part 312 turns on the NMOS transistor MN321 of the power supply controller 320 when the signal of the second comparator COMP311 is converted to a high signal, and then, the voltage across the resistance R321 rises by degrees.

The NiCd/NiMH battery BAT is charged by repeating the operations above. During that time, in the early rapid charging state, the output signal of the charge detection section 200 is expressed by the waveform shown in FIG. 3A when it provides the battery BAT with a high current, and a rapid charging operation is proceeded.

A signal reporting the end of the charging is outputted from the charging state detection part 220 when the battery BAT is fully charged. This signal causes the transistor Q231 of charging form converter 230 to be turned "ON".

The output signal from the charge detection section 200 outputted during the trickle charging is restricted by the second reference voltage Vref2 outputted from a reference voltage generator Vs231, and by the collector-emitter voltage of the saturation state of the transistor 231. Its value is distributed according to the second and the third resistances R232, R233, and is expressed as follows:

$$\frac{R233}{R232 + R233} (Vref2 + V_{CE(sat)}) \quad (1)$$

During the trickle charging operation, charging form control section 300 has an output waveform as expressed in FIG. 3B, so that it may compensate for the loss of charge due to the leakage discharge of the battery charged by the rapid charging.

The current flowing in the first coil L101 of the charging section 100 is expressed as in the following expression (2). That is, when the values of the first and second coils L101, L102 are constant, if the inputted power supply VCC rises, the rate of change of the current rises, the efficiency is reduced, and, consequently, there is no change in the input power.

$$\frac{di}{dt} = \frac{VCC}{L101} \quad (2)$$

That is, power is provided to the battery constantly regardless of changes in the driving power supply VCC.

The effect of the present invention operating as above is to provide a battery charging circuit with charging form conversion control for a NiCd/NiMH battery. The completion of the rapid charging operation is determined according to the current provided to the battery by the current-mode PWM. After completely charging the battery, the maximum value of the supply current is restricted from the amount required to charge a NiCd or a NiMH battery rapidly, so that it may compensate for the charging loss of a battery due to the leakage discharge by adjusting a trickle current provided to the second coil.

Although the present invention has been described above with reference to a preferred embodiment thereof, those skilled in the art will appreciate that various substitutions and modifications can be made thereto without departing from the spirit and scope of the invention as set forth in the appended claims.

What is claimed is:

1. A battery charger for a battery, comprising:
    a charging circuit which receives a charging current through induction from a power supply and applies said charging current to said battery;
    a charge detection circuit which detects a charge state of said battery and outputs a charge state signal corresponding to said charge state; and
    a charging form control circuit which receives said charge state signal from said charge detection circuit and which selects between one of a rapid charging rate and a trickle charging rate by adjusting an amount of said charging current in correspondence with said charge state signal from said charge detection circuit, said charging form control circuit including:
        a signal generator which generates a pulse signal having either a high or a low frequency according to said charge state signal outputted from said charge detection circuit, and
        a power supply controller which adjusts said amount of said charging current induced by said charging circuit by controlling an amount of power supply current flowing through said charging circuit according to said pulse signal outputted from said signal generator.

2. The battery charger according to claim 1, wherein said charging circuit includes:
    a first coil having one terminal coupled to said power supply;
    a second coil in which said charging current is induced from said first coil;
    a diode coupled between said second coil and a first terminal of said battery;
    a capacitor coupled between said first terminal of said battery and a ground potential; and
    a resistance coupled between a second terminal of said battery and said ground potential.

3. A battery charger according to claim 2, wherein said charge detection circuit includes:
    a charge comparator which outputs a charging rate signal by monitoring said charging current induced by said charging circuit;
    a charge state detector which monitors a charge voltage of said battery and outputs a charge completion signal as long as said battery is charged; and
    a charging form converter which receives said charging rate signal outputted from said charge comparator and said charge completion signal outputted from said charge state detector and outputs said charge state signal to said charging form control circuit.

4. A battery charger according to claim 3, wherein said charge comparator includes:
    a first error amplifier having:
        an inversion input terminal which is coupled to a terminal of said resistance of said charging circuit, said charge comparator monitoring said charging current by monitoring a voltage across said resistance, and
        a non-inversion input terminal coupled to a first reference voltage; and
        an impedance coupled between said inversion input terminal and an output terminal of said first error amplifier.

5. A battery charger according to claim 4, wherein said charging form converter includes:
    a transistor which is controlled by said charge completion signal of said charge state detector; and
    a second reference voltage generator, a channel of said transistor being formed between said second reference voltage generator and said ground potential.

6. A battery charger according to claim 1, wherein said power supply controller includes:
    a switching controller which controls said amount of said power supply current according to said pulse signal of said signal generator; and
    a sensor which monitors said amount of said power supply current and which outputs a voltage value corresponding to said amount.

7. A battery charger according to claim 6, wherein said switching controller is an NMOS transistor controlled by said pulse signal of said signal generator, a channel of said NMOS transistor being coupled between said first coil of said charging circuit and said sensor.

8. A battery charger according to claim 7, wherein said sensor is a resistor coupled between a source terminal of said NMOS transistor and said ground potential.

9. A battery charger according to claim 8, wherein said signal generator includes:
    a second comparator having:
        a non-inversion input terminal coupled to said charge state signal output from said charge detection circuit,
        an inversion input terminal coupled to said sensor of said power supply controller, and
        an output terminal which supplies a result signal; and
    a driving part which outputs said pulse signal to drive said NMOS transistor of said power supply controller according to said result signal output by said second comparator.

10. A battery charger according to claim 1, wherein said battery is one of a NiCd battery and a NiMH battery.

11. A battery charger according to claim 5, wherein said charging form control circuit adjusts said charging current for said rapid charging rate when said charge state signal is a first voltage level and adjust said charging current for said trickle charging rate when said charge state signal is a second voltage level.

12. A battery charger according to claim 11, wherein said trickle charging rate is a substantially constant current.

13. A battery charger for a battery, comprising:
    a charging circuit which receives a charging current through induction from a power supply and applies said charging current to said battery, said charging circuit including:
        a first coil having one terminal coupled to said power supply;
        a second coil in which said charging current is induced from said first coil;
        a diode coupled between said second coil and a first terminal of said battery;
        a capacitor coupled between said first terminal of said battery and a ground potential; and
        a resistance coupled between a second terminal of said battery and said ground potential;
    a charge detection circuit which detects a charge state of said battery and outputs a charge state signal corresponding to said charge state; and
    a charging form control circuit which receives said charge state signal from said charge detection circuit and which selects between one of a rapid charging rate and a trickle charging rate by adjusting an amount of said charging current in correspondence with said charge state signal from said charge detection circuit.

14. A battery charger according to claim 13, wherein said charge detection circuit includes:
a charge comparator which outputs a charging rate signal by monitoring said charging current induced by said charging circuit;
a charge state detector which monitors a charge voltage of said battery and outputs a charge completion signal as long as said battery is charged; and
a charging form converter which receives said charging rate signal outputted from said charge comparator and said charge completion signal outputted from said charge state detector and outputs said charge state signal to said charging form control circuit.

15. A battery charger according to claim 14, wherein said charge comparator includes:
a first error amplifier having:
an inversion input terminal which is coupled to a terminal of said resistance of said charging circuit, said charge comparator monitoring said charging current by monitoring a voltage across said resistance, and
a non-inversion input terminal coupled to a first reference voltage; and
an impedance coupled between said inversion input terminal and an output terminal of said first error amplifier.

16. A battery charger according to claim 14, wherein said charging form converter includes:
a transistor which is controlled by said charge completion signal of said charge state detector; and
a second reference voltage generator, a channel of said transistor being formed between said second reference voltage generator and said ground potential.

17. A battery charger according to claim 13, wherein said charging form control circuit includes:

a signal generator which generates a pulse signal having either a high or a low frequency according to said charge state signal outputted from said charge detection circuit; and
a power supply controller which adjusts said amount of said charging current induced by said charging circuit by controlling an amount of power supply current flowing through said first coil of said charging circuit according to said pulse signal outputted from said signal generator.

18. A battery charger according to claim 17, wherein said power supply controller includes:
a switching controller which controls said amount of said power supply current according to said pulse signal of said signal generator; and
a sensor which monitors said amount of said power supply current and which outputs a voltage value corresponding to said amount.

19. A battery charger according to claim 18, wherein said switching controller is an NMOS transistor controlled by said pulse signal of said signal generator, a channel of said NMOS transistor being coupled between said first coil of said charging circuit and said sensor.

20. A battery charger according to claim 19, wherein said sensor is a resistor coupled between a source terminal of said NMOS transistor and said ground potential.

21. A battery charger according to claim 20, wherein said signal generator includes:
a second comparator having:
a non-inversion input terminal coupled to said charge state signal output from said charge detection circuit,
an inversion input terminal coupled to said sensor of said power supply controller, and
an output terminal which supplies a result signal; and
a driving part which outputs said pulse signal to drive said NMOS transistor of said power supply controller according to said result signal output by said second comparator.

* * * * *